United States Patent [19]
McLoughlin

[11] 3,946,143
[45] Mar. 23, 1976

[54] HEAT RECOVERABLE ARTICLE FOR PROTECTING JUNCTIONS
[75] Inventor: Robert H. McLoughlin, Swindon, England
[73] Assignee: Raychem Limited, London, England
[22] Filed: Sept. 9, 1974
[21] Appl. No.: 504,375

[30] Foreign Application Priority Data
Sept. 10, 1973 United Kingdom............ 42483/73

[52] U.S. Cl.......... 174/84 R; 174/DIG. 8; 174/88 C
[51] Int. Cl.²................................. H02G 15/08
[58] Field of Search.......... 174/DIG. 8, 84 R, 88 C, 174/75 C, 88 R

[56] References Cited
UNITED STATES PATENTS
3,253,618  5/1966  Cook ...................... 174/DIG. 8 U FOREIGN PATENTS OR APPLICATIONS
1,259,774  1/1972  United Kingdom............ 174/DIG. 8

Primary Examiner—Darrell L. Clay
Attorney, Agent, or Firm—Lyon & Lyon

[57] ABSTRACT

A heat recoverable article for shielding junctions in cables or conduits comprised of a corrugated sheath capable of radial deformation disposed within a member of heat-recoverable material. A sheath made of conductive material may function to protect the junction from radio frequency interference. The end of the member may be provided with adhesive to render the junction impermeable to water, gases, etc.

11 Claims, 2 Drawing Figures

HEAT RECOVERABLE ARTICLE FOR PROTECTING JUNCTIONS

BACKGROUND OF THE INVENTION

The present invention relates to a recoverable, especially to a heat-recoverable, article and a method for protecting or shielding a junction or discontinuity in cables or conduits and in particular relates to shielding coaxial cables and other cables having a conductive outer shield from external radio frequency interference.

Heat recoverability is characterized by the ability to undergo a permanent change in dimensions with the application of heat. In general, the property of heat recoverability can be imparted to a material having a plastic or elastic memory by expanding the material at an elevated temperature to a size greater than its normal size and then cooling while maintaining the material in the expanded size.

The prior art methods of shielding cables from external radio frequency interference have been plagued by the problem of leakage. The problem is particularly acute at a junction between two or more such cables where it is important that the continuity of the outer conductive shield be maintained in both longitudinal and circumferential directions in order to provide adequate screening against stray radiation.

The use of heat-recoverable tubing in connection with the shielding and protecting of cable junctions and the like is known. Also, the use of a heat-shrinkable tubing "sandwiched" with conductive braid is known as described in U.S. Pat. No. 3,253,619, the disclosure of which is incorporated herein by reference. Although braided shields have been used to protect coaxial cables from radio frequency interference, I have perceived that the utility of these shields could be greatly enhanced if the shield could be formed to protect the cable from high frequency radiation which is capable of penetrating the interstices between the strands of a braided shield and shaped so that it is capable of deforming uniformly when the tubing with which it is sandwiched is caused to be recovered.

It is thus an object of the present invention to provide a recoverable, especially a heat-recoverable article for effectively protecting or shielding a junction or discontinuity in conduits or cables from radio frequency interference, water, gas, solvents etc.

This and other objects are accomplished by shielding or protecting a junction or discontinuity in conduit or cable with an article comprised of a member of heat-recoverable material having a corrugated sheath disposed therein.

A more thorough disclosure of the objects and advantages of the invention is presented in the detailed description which follows and in the accompanying drawings in which.

Figure 1:
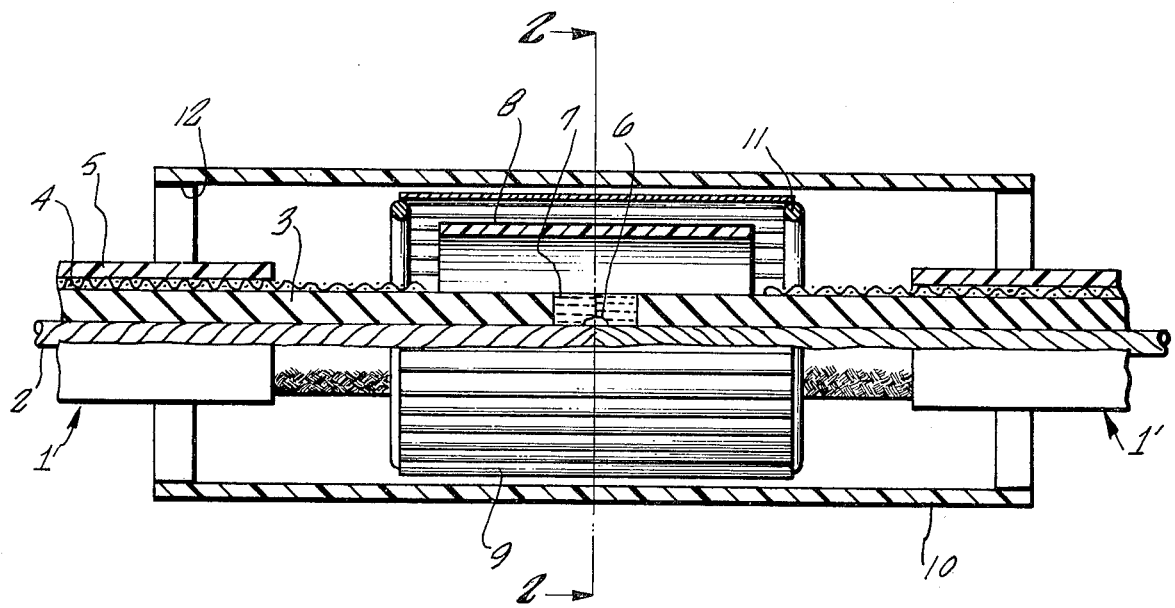
FIG. 1 is a longitudinal sectional view showing a heat-recoverable article positioned over a junction of a coaxial cable with the heat-recoverable member in an expanded state.

The heat-recoverable article of the present invention finds particular application in the protection of junctions in coaxial and other types of electric cables having a conductive outer shield. However, the article is also very useful for rendering conduit junctions waterproof or impervious to gases, solvents etc.. The heat-shrinkable member may be made of any suitable material, for example those described in British patent specifications numbers 990,235, and 1,062,043. The modulus and/or the recovery stress of the member should be sufficient to crush, and deform the corrugated sheath into the desired shape. Polyolefines, especially polyethylene, and polyvinylidene fluoride may be used. The polymers may be cross-linked by chemical means or by irradiation and may also contain the conventional additives (fillers, flame retardants, anti-oxidants etc.).

The heat-shrinkable member is preferably formed as a sleeve, but can be formed as a boot or breakout. When the heat-recoverable member is a boot it is formed as a substantially straight tube but upon recovery the tube becomes bent. The heat-shrinkable member can also be used to compress only part of a sheath disposed only partially therein. In the case where the heat recoverable article is used as a barrier against moisture, gases or solvents, the ends of the heat recoverable sleeve preferably extend beyond the ends of the sheath. The ends of the sleeve are then coated entirely or in part on the inside with sealant, for example mastic or a hot-melt adhesive, such that, when the sleeve is shrunk down, the ends are sealed to the conduits to form a waterproof bond.

The heat-recoverable sleeve is provided with a sheath which is disposed therein and positioned so that the sheath is coaxial and proximate to the sleeve. The sheath is provided with a plurality of other end. These corrugations are capable of collapsing inwardly when the sleeve is recovered by the addition of heat. During the recovery process, the sleeve imposes a radially inwardly directed force on the sheath resulting in a decrease in the mean diameter of the sheath. The mean diameter of the sheath is defined by points located midway between the radial extremes of the corrugations. The corrugations enable the sheath to be pushed into a predetermined shape when the surrounding sleeve is recovered. The corrugations are preferably disposed in a longitudinal array parallel to the axis of the sheath but may also be for example, zigzag or in the form of a sine curve. If the sheath has regular zigzag corrugations, the angle between the phases is preferably from 70° to 120°. A copper sheath may have, for example, folds at intervals of about 0.3 cm. with an angle between the phases of approximately 110°. When the heat-recoverable member is a boot, it is preferable for the sheath to be transversely corrugated, at least in the region of bending, as well as longitudinally corrugated along its whole length. With more complex shrinkable parts, it may be necessary to use more than one appropriately shaped sheath, each with suitable corrugations.

Preferably the sheath completely surrounds the junction. The sheath may be a continuous seamless tube, or it may be made from sheet capable of being wrapped around the junction provided there is sufficient overlap to ensure continuity. However, any seam in the sheath formed from a sheet should be rendered waterproof, for example, by welding or soldering, if the purpose of the sheath is to prevent moisture ingress.

When the article is to be used to provide radio frequency interference shielding, the sheath is made of a conductive material. Metal foil is particularly suitable because of its ductility and any soft metal having good electrical and thermal properties may be used, such as coppr, aluminum, gold, tin, silver, or platinum. The foil may be pre-tinned to facilitate soldering.

Metal foil may also be used in applications where electrical conductivity is not required, for example, when the article is primarily used as a barrier against water vapor. For vapor barrier applications aluminum foil is especially suitable. However, any material possessing suitable properties of deformability and impermeability to water, gases, solvents, etc., as required, may also be used.

When the sheath is comprised of metal foil, the thickness is preferably within the range of from 0.001 to 0.015 cm. Thinner foils tend to tear in use and are also somewhat difficult to obtain. Metal foils thicker than 0.015 cm are difficult to corrugate and tend to recover non-uniformly. The preferred thickness of a particular application depends on various factors, for example the amount of recovery required, the shape of the joint after recovery, the metal used, the size of the joint, the shape of the sheath and the modulus of the heat-shrinkable sleeve.

Preferably the corrugated sheath has disposed within it an inner heat-shrinkable sleeve, such that the sheath is sandwiched between two heat-shrinkable sleeves. The inner sleeve is positioned so that it is coaxial and proximate with the sheath. The inner sleeve provides protection to the conduits from the collapsing sheath during the recovery process. For example, the inner sleeve may prevent injury to the foam dielectric in a coaxial cable from the sharp edges of a metal-foil sheath as it is compressed by the shrinkage of the outer sleeve.

When the article is used for a junction in an electric cable having an outer shield, the corrugated sheath is of such a length that, when the article is in position, it forms a complete and ocntinuous conductive shield around the junction. Preferably, means are incorporated for ensuring a good and permanent electrical contact between the sheath and the outer shield of the or each cable, for example, solder rings, preferably pre-fluxed solder rings, may be placed under or adjacent to the ends of the sheath such that, during shrinkdown, soldering occurs between the metal of the sheath and the outer shield of the cables. Where such a soldered attachment is to be made, the sheath is most suitably made of copper or tin.

Figure 2:
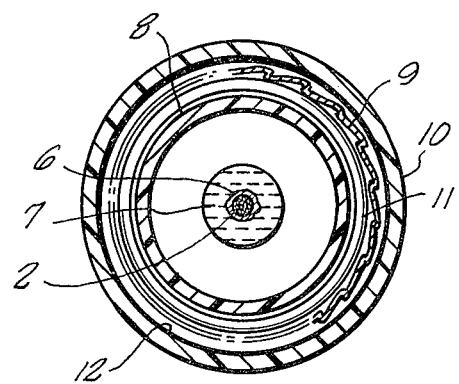
FIG. 2 is a cross sectional view of the junction with the heat-recoverable member in a recovered state as it would appear if viewed along line 2—2 of FIG. I.

Referring now to FIGS. 1 and 2, two coaxial cables 1,1' to be joined each consist of a central conductor 2, dielectric material 3, a shield 4 of conductive braid, and an insulative jacket 5. The central conductors 2 are joined by means of a solder joint 6 which is surrounded by dielectric filler 7. The junction is surrounded by a sandwich consisting of an inner heat-shrinkable sleeve 8, a corrugated copper sheath 9, and an outer heat-shrinkable sleeve 10. A soft solder ring 11 is positioned at each end of the copper sheath 9. Alternatively, solder rings could be attached to the inner wall of outer sleeve 10. Hot-melt adhesive 12 is provided at the end regions of the outer sleeve 10.

When the article is heated, the sleeves 8 and 10 shrink and the corrugated sheath is radially deformed. The ends of the sheath become soldered to the conductive braid 4 by means of the solder rings 11 and a continuous conductive shield is thereby formed over the length of the junction. The ends of the outer heat-shrinkable sleeve 10 become sealed to the outer jacket 5 of the coaxial cables by means of the hot-melt adhesive 12, thus rendering the joint waterproof.

The impedance of the joint described above was $700\mu\omega$ immediately after assembly and $740\mu\omega$ after passing 100 amps for three hours.

I claim:

1. A heat-recoverable article comprising a first heat-recoverable member and at least one generally tubular sheath disposed therein having a plurality of corrugations formed in said sheath each being predisposed to collapse inwardly upon the imposition of the radially inwardly directed force of heat recovery of said first heat-recoverable member so as to diminish the mean diameter of the sheath.

2. A heat-recoverable article as in claim 1, wherein said corrugations are disposed in a longitudinal array parallel to the axis of said sheath.

3. A heat-recoverable article as in claim 1, wherein a second heat-recoverable member is disposed within said sheath.

4. A heat recoverable article as in claim 1, wherein said sheath is formed of a conductive material.

5. A heat-recoverable article as in claim 4, wherein said conductive material is a metal foil.

6. A heat-recoverable article as in claim 1, wherein the inner wall of the ends of said sheath are provided with solder rings.

7. A heat-recoverable article as in claim 1, wherein the inner wall of the ends of said first member are provided with an adhesive.

8. A heat-recoverable article as in claim 1, wherein said heat-recoverable member is comprised of a cross-linked polymer.

9. A heat-recoverable article as in claim 1, wherein said heat-recoverable member is comprised of an irradiated polymer.

10. An article comprising a dimensionally unstable hollow member capable of recovering toward an original dimension, and a sheath having generally longitudinal corrugations disposed within said member, said corrugations being collapsible by recovery of said member toward said original dimension.

11. A heat-recoverable article comprising a first polymeric heat-recoverable sleeve having adhesive disposed in the ends thereof, at least one generally tubular metal sheath disposed therein having solder rings disposed on the ends thereof and a plurality of longitudinally corrugations formed in said sheath, each said corrugation being predisposed to collapse inwardly upon the imposition of the radially inwardly directed force of heat recovery of said sleeve so as to diminish the mean diameter of the sheath and a second polymeric heat-recoverable sleeve disposed within said sheath.

* * * * *